July 16, 1968  K. D. DEMAREST  3,392,710

COMBINED COMBUSTOR SCREEN AND GAS FLOW DISTRIBUTOR

Filed June 7, 1967

INVENTOR
KENNETH D. DEMAREST
BY
ATTORNEY

# United States Patent Office 3,392,710
Patented July 16, 1968

3,392,710
COMBINED COMBUSTOR SCREEN AND GAS FLOW DISTRIBUTOR
Kenneth D. Demarest, Mendham, N.J., assignor to Foster Wheeler Corporation, Livingston, N.J., a corporation of New York
Filed June 7, 1967, Ser. No. 644,213
7 Claims. (Cl. 122—7)

ABSTRACT OF THE DISCLOSURE

A heat shield for use in a vapor generator in which waste heat gas fuel such as carbon monoxide is combusted. The heat shield is disposed between the furnace section and tube bank section of the vapor generator to serve as refractory insulation for supporting combustion in the furnace section and also to allow for the passage of the combusted gas from the furnace section into the tube bank section.

Background of the invention

In the operation of vapor generators in which waste gases are combusted, it is desirable to maintain the highest possible temperatures in the combustion chamber. This is achieved by providing refractory lined inner walls in the combustion chamber, since exposure of the waste heat gas to heat absorbing surfaces will lower the temperature in the combustion chamber and cause incomplete combustion unless there is considerable increased heat input. Accordingly, shielding of the heat absorbing tube bank from the combustion zone is required.

It is also highly desirable that the combustion gases on passing into the tube bank sections be evenly distributed to avoid channeling and resulting inefficient heat transfer Thus, it has geen customary to employ a refractory grid or checkerwork structure to accomplish both the shielding and flow distribution functions.

In accordance with the present invention, shielding means have been provided in the screen tube section which serve as a heat insulator while still allowing the heat absorbing surfaces of the tubes to function properly. Thus, the face of the screen tube section opposite from the combustion chamber functions as a heat absorbing surface and the respective reverse face of the screen tube section serves as a mounting surface for the shielding means, such that the combustion gases are uniformly distributed to the tube bank section. Accordingly, it is possible to utilize the shielding means to maintain maximum operating temperatures in the combustion chamber.

Summary of the invention

In accordance with an illustrative embodiment demonstrating features and advantages of the present invention, there is provided a vapor generator capable of burning waste heat gas fuel. The vapor generator comprises an insulated furnace section for combusting the gas fuel and a tube bank section in gas flow communication with the furnace section for producing steam. The tube bank section includes fluid-filled tubes adjacent to the furnace section. A plurality of refractory heat shielding means are spaced-apart on the fluid tubes in staggered relationship. Thus, the heat shielding means form a passage for the combusted gases to pass from the furnace section into the tube bank section and insulate the furnace section to support the combustion of the waste heat gas.

Brief description of the drawings

The above brief description, as well as further objects, features, and advantages of the present invention will be more fully appreciated by reference to the following detailed description of a presently preferred but nonetheless illustrative embodiment in accordance with the present invention, when taken in connection with the accompanying drawings wherein.

Description of the preferred embodiment

Figures 1, 2, 3:
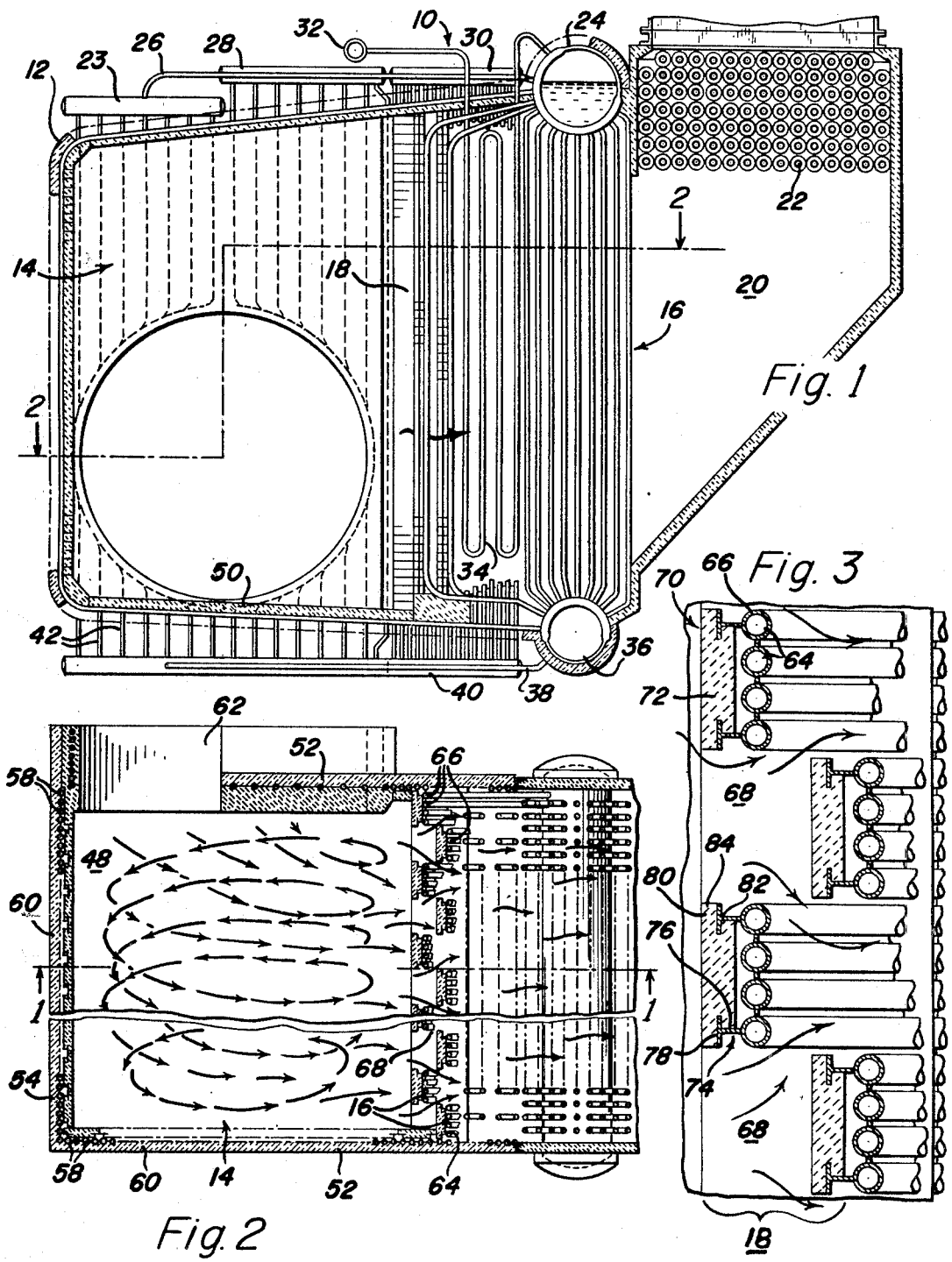
FIG. 1 is a sectional view of a vapor generator in which the heat shielding means of the present invention are employed.
FIG. 2 is a transverse sectional view of the vapor generator taken along the line 2—2 of FIG. 1 and looking in the direction of the arrows, with the combustion gas path being shown by the directional arrows.
FIG. 3 is an enlarged sectional view of a portion of the heat shield as shown in FIG. 2.

Referring now to the drawings for a more detailed description of the present invention and more particularly to FIG. 1, a vapor generator generally designated by the reference numeral 10 is shown. It should be understood that the present invention is readily applicable to various types of waste heat vapor generators, and in particular to carbon monoxide gas fired vapor generators. The vapor generator 10 is encased in a metal housing 12 and comprises a furnace section 14, a tube bank section 16 including a screen tube zone 18, and a flue section 20 in which there is provided an economizer 22. The vapor generator 10 is provided with a primary outlet header 23, which is placed in flow communication with steam drum 24 through line 26. A pair of secondary headers 28 and 30 are in indirect heat exchange relatonship with line 26. A superheater header 32 is also directly connected in flow communication with steam drum 24 by superheater tubes 34 which are included in tube bank section 16. The steam drum 24 communicates with a water drum 36 through tube bank section 16 and an outlet line 38 from the water drum 36 is in indirect heat exchange relation with an inlet header 40 which in turn communicates with headers 23, 28, and 30 by means of riser tubes 42.

The furnace section 14 includes an internal chamber 48 which is defined by a bottom wall 50, two upstanding side walls 52, a back wall 54, and roof wall 56, that are lined with boiler tubes 58 which are sandwiched between sheets of refractory material 60. The screen tube section 18 is located at the open free ends of bottom wall 50, side walls 52, and roof wall 56. The furnace section 14 also includes a cylindrically shaped burner chamber 62 which is shown schematically in the drawings for introducing carbon monoxide gas and an oxygen-containing combustio-supporting gas such as air into furnace chamber 48. A small pilot burner, not shown in the drawings, is provided in chamber 62 to insure that the adiabatic combustion temperature tor combusting carbon monoxide is maintained.

The screen tube zone 18 comprises individual tube elements 64 which are joined together by fin walls into integral tube panels 66 that are spaced-apart or staggered to form gas passages 68. As best shown by the directional arrows in FIGS. 2 and 3, the combusted gas from furnace section 14 flows through passages 68 which are formed between adjacent free edges of tube panels 66.

In accordance with the present invention, heat shielding means 70 are positioned in screen tube zone 18. The heat shielding means 70 include refractory panels 72 mounted on each of tube panels 66, such that refractory panels 72 are positioned between furnace section 14 and the outer surfaces of tube panels 66 which are coextensive with furnace section 14. The refractory panels 72 extend vertically from bottom wall 50 to roof wall 56 and extend horizontally across each of tube panels 66, with the vertical side portions of refractory-panels 72 located on opposite sides of gas passages 68. The refractory panels 72 are mounted on tubes 64 in zone 18 by means of flange supports 74 having a T-shaped cross section, defined by fin walls 76 integrally formed with cross walls 78. The fin walls 76 are welded to the outer end tubes 64 of panels 66 and the cross walls 78 are welded to the free ends of fin walls 76. As best shown in FIG. 3, the opposite sides of refractory panels 72 are integrally formed with outer shoulders 80 and inwardly extending channels 82. The shoulders 80 and channels 82 are sized to receive cross walls 78 in a press fit, such that the flange supports 74 securely support the panels 72.

A coolant is circulated in the tube elements 64 of screen zone 18, thereby permitting low metal design temperatures in the fabrication of the panels 66. Since one side of screen zone 18 confronts the tubes in section 16, it is possible to achieve heat absorption, while the other side of screen zone 18 which confronts furnace 14 supports heat shielding means 70.

In order to more clearly describe and illustrate the present invention, reference is now made to the following operational example of the vapor generator 10 which will be fired by carbon monoxide gas. Carbon monoxide in the order of 5 to 10% by weight can be obtained from regeneration gas in a cracking unit, such as is used in the refining of petroleum. The carbon monoxide-containing gas, which is usually available at temperatures from between 500° F. and 1200° F., and air for combusting the carbon monoxide are introduced into chamber 62. The carbon monoxide-containing gas also usually includes nitrogen, carbon dioxide, and water vapor. The pilot burner in chamber 62 insures that the resulting adiabatic combustion temperature is maintained sufficiently above combustion temperatures of between 1400 and 1500° F., which for stable operation should preferably be approximately from 1700 to 1800° F. This stable operating temperature range is maintained in furnace section 14 by providing the shielding means 70 which serves as a combined refractory lined enclosure and gas distribution outlet.

From the foregoing it can be appreciated that the gas combusted in furnace section 14 is uniformly distributed across tube bank section 16 and particularly across the superheater tubes 34. Thus, by staggering the tube panels 66, the heat shield 70 is maintained in a confronting position with respect to furnace section 14, and the combusted gas is also caused to flow at a relatively high velocity toward the heat absorbing surfaces of the tubes 64 which are spaced between refractory panels 72 and tube bank section 16. In this manner, the heat shielding means 70, while being supported on the heat absorbing surfaces of tube panels 66, serve as a combined insulator and passage for the combusted gas from furnace section 14.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:

1. A vapor generator capable of burning waste heat gas fuel comprising an insulated furnace section for combusting said gas fuel, a tube bank section including fluid-filled tubes adjacent to said furnace section in gas flow communication for producing steam, and a plurality of refractory shielding means spaced-apart on said fluid tubes in staggered relationship such that said shielding means form a passage for the combusted gases to pass from said furnace section into said tube bank section and insulate said furnace section to support the combustion of said waste heat gas.

2. A vapor generator for combusting a carbon monoxide-containing gas fuel according to claim 1, in which said tube bank section includes a screen tube zone adjacent to said furnace section with fin members fixed between the tubes in said screen zone to form fin walls, and said fin walls spaced apart from each other and positioned in accordance with said staggered relationship of the refractory shielding means.

3. A vapor generator according to claim 2 in which said refractory shielding means include panels which are coextensive with said fin walls.

4. A vapor generator capable of burning a carbon monoxide-containing gas fuel comprising an insulated furnace section formed with an inlet fuel orifice and a combusted gas outlet, a tube bank section of water-filled tubes including a screen tube zone which confronts said gas outlet, fin members fixed between said water-filled tubes of said screen tube zone, a plurality of fin-walls formed by joining together said fin members and water filled tubes of said screen tube zone, said fin walls spaced apart from each other in staggered relationship to form gas passes such that said furnace section is in gas flow communication with said tube bank section for producing steam, and panels of refractory material mounted on said fin-walls and positioned to confront said gas outlet in accordance with said staggered relationship of the fin walls, whereby said furnace section is insulated to support the combustion of said carbon monoxide-containing gas fuel.

5. A vapor generator according to claim 4 in which said panels of refractory material are mounted on said fin walls by flange supports each of which includes an elongated wall integrally formed with a cross wall, and each of said elongated walls mounted on said fin walls and said cross walls mounted to said panels.

6. A vapor generator according to claim 4 in which each of said refractory panels is coextensively positioned on each of said fin-walls.

7. A vapor generator according to claim 4 in which said furnace section includes an internal chamber having a substantially rectangular parallelepiped configuration bounded by a base wall, a pair of upstanding side walls, a roof wall, a rear wall and said gas outlet, and each of said refractory panels extend vertically between said base wall and roof wall and laterally across each of said fin walls such that said gas passes extend laterally between adjacent refractory panels.

References Cited
UNITED STATES PATENTS

| | | | |
|---|---|---|---|
| 3,192,905 | 7/1965 | Barnes | 122—7 |
| 3,260,243 | 7/1966 | Wiesenthal et al. | 122—7 |

KENNETH W. SPRAGUE, *Primary Examiner.*